J. SLOAN.
VEHICLE FOR TRANSPORTING AEROPLANES.
APPLICATION FILED SEPT. 10, 1914.
1,184,493.
Patented May 23, 1916.
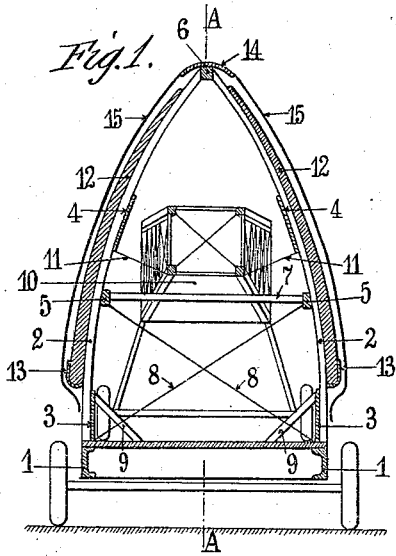
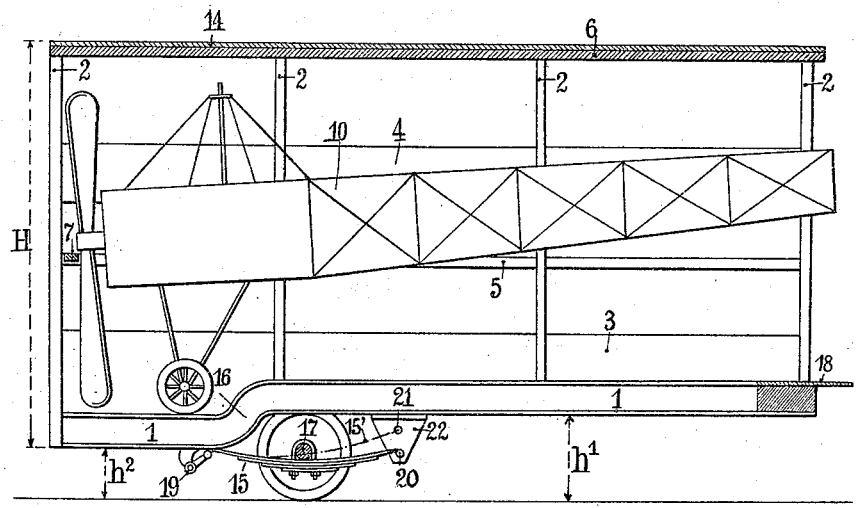
WITNESSES
INVENTOR
Jacques Sloan
BY
ATTORNEYS

UNITED STATES PATENT OFFICE.

JACQUES SLOAN, OF PARIS, FRANCE, ASSIGNOR TO COMPAGNIE DES FORGES ET ACIERIES DE LA MARINE ET D'HOMECOURT, OF PARIS, FRANCE.

VEHICLE FOR TRANSPORTING AEROPLANES.

1,184,493.

Specification of Letters Patent.

Patented May 23, 1916.

Application filed September 10, 1914. Serial No. 861,056.

*To all whom it may concern:*

Be it known that I, JACQUES SLOAN, a citizen of the French Republic, and residing at 17 Rue du Louvre, Paris, France, engineer, have invented certain new and useful Improvements in and Relating to Vehicles for Transportating Aeroplanes, of which the following is a complete specification.

The vehicles hitherto proposed for transporting aeroplanes generally consist of a chassis or carriage frame surmounted by a framework consisting of a certain number of half hoops connected by longitudinal beams and planks, the whole being covered with an awning or any other means of covering. The aeroplane body detached from the wings, occupies the middle, and the wings are arranged on either side inside the vehicle.

That arrangement has several drawbacks:—1. The clearance which must be left between the wings and the aeroplane body for convenience in handling them, renders it necessary to give the framework a great width and to give the hoops a shape approaching a rectangle or a full semi-circle, these being shapes presenting little strength transversely. 2. In spite of this clearance there is nothing to prevent the aeroplane body coming accidentally into collision with the wings during handling. 3. The presence of the wings inside the vehicle is an obstacle to readily providing certain means there for insuring the rigidity of the framework, such as cross bars, cross stays, struts, etc., and attaching the aeroplane body thereto to keep it steady during travel. The result is that the framework of the vehicle requires to be heavy in order to be solid.

Now the present invention has for its object to provide an improved vehicle for transporting aeroplanes which has none of those drawbacks and may be made very light.

In the improved vehicle the wings, arranged outside the framework rest upon the arches or half hoops which, for this purpose, have externally the form of the internal profile of the wings, and their lower edge rests at the bottom of an outside longitudinal gutter. They are thus placed between the framework and the awning. This arrangement allows of giving the hoops the form of ogives, a form which in itself presents transverse strength. The framework with its hoops, beams and planks separates the wings from the aeroplane body and prevents these parts coming into contact.

There is nothing except the aeroplane body (which furthermore has only a limited section over a greater part of its length) to prevent the fitting of cross bars, cross stays or struts inside the vehicle. It is possible without difficulty to put the aeroplane body in and take it out, and also to attach this body to the framework of the vehicle. To prevent the contact of the awning with the top of the wings the ridge beam is provided with a reversed gutter and the end hoops are made of a suitable outside gage.

The vehicle is finally characterized by the way in which the longitudinal members of its chassis are arranged, and a system of fixing the suspension springs, which allows of reducing the total height of the car when putting on board, with a view in particular to conforming to the requirements of railway loading gages.

One constructional form of the improved vehicle forming the subject-matter of this invention is illustrated by way of example in the accompanying drawings.

Figure 1 is a view of the vehicle in cross section; Fig. 2 is a longitudinal section along the line A—A of Fig. 1.

In the example shown 1, 1 are the longitudinal members of the chassis; 2, 2 are the branches of the half hoops or arches forming the framework; 3, 3 and 4, 4 are longitudinal planks; 5, 5 are longitudinal beams and 6 is the ridge beam; 7 is a cross piece; 8, 8 are cross stays; 9, 9 are struts.

10 is the body of the aeroplane; 11, 11 are the fastenings of the body to the framework; 12, 12 are the two wings; 13, 13 are two gutters at the bottom of which their lower edges rest; 14 is the reversed gutter fixed to the ridge beam 6; 15, 15 is the awning covering the whole.

The construction of the longitudinal members 1, 1 of the chassis is shown in Fig. 2.

In order to facilitate the operation of loading and unloading, and to reduce as far as possible the total height H of the car, these longitudinal members are arranged as close to the ground as possible; nevertheless this distance $h'$ from the ground must be sufficient to allow of the play of the suspension springs 15 of the car. Toward the back of the vehicle these members are curved at 16, so as to be lower behind the axle at a distance $h^2$ from the ground less than the distance $h'$. This arrangement allows of increasing the space available at the back of the vehicle, that is to say at the part where the bulkiest parts of the aeroplane are situated, without modifying the total height H. This arrangement thus allows of making the rear part of the vehicle as high as possible compatible with the minimum play required for the springs, with the minimum total height for the passing beneath railway loading gages, and with the minimum height required above the ground, so that the front of the aeroplane enters it and is lodged therein conveniently and without dismantling.

The vehicle is mounted on two axles only, one of which, the axle 17, is shown in the accompanying drawings; the other axle forming part of a movable and separable limber coupled at 18 to the front of the chassis.

In order still further to reduce the height H for loading on a railway truck the springs 15, which are fastened at one end at 19, are fixed at their other end to a pin which can be inserted either in the eye 20 or in the eye 21 of the bracket 22.

In traveling order, the spring 15 is fixed at 20. At the time of loading, the front pin of the spring is taken out and inserted into 21, the spring then occupying the position 15'.

What I claim is:

1. A vehicle for the transport of aeroplanes comprising a chassis surmounted by a framework composed of a number of half hoops connected by longitudinal beams and planks, the whole covered with an awning or tilt wherein the said hoops have the form of ogives, the branches of which adapt themselves to the shape of the ribs of the aeroplane wings, this ogival form giving them natural transverse strength.

2. A vehicle for transporting aeroplanes, comprising a wheeled frame having a cover in the form of a pointed arch, the cover having on the exterior of its frame between it and the cover proper, longitudinally extending gutters to receive and support the aeroplane wings, for the purpose of reducing the width of the framework to what is strictly necessary to contain the aeroplane body, of preventing the said body and the articles placed inside the car from coming into contact with the wings, and of allowing of providing without difficulty inside, the necessary means for stiffening the structure and the means for fixing the aeroplane body to the cover frame.

3. In a vehicle of the character described, the combination of a frame, springs having one end pivotally secured to the frame and carrying at their other ends pins, a bracket depending from the frame and provided with a plurality of openings for receiving the pins of the springs, and wheels mounted in the springs.

4. A vehicle for transporting aeroplanes comprising a covered frame adapted to receive the aeroplane body detached from the wings and the wings for the said body, means on the side of said frame for supporting the wings on each side of the frame between the said frame and the cover thereof.

5. A vehicle for transporting aeroplanes comprising a covered frame adapted to receive the aeroplane body detached from the wings, the sides of said frame having the shape of the internal sides of the wings, said sides of the frame having means adapted to receive and support the wings and to prevent the contact of the wings with the body.

6. A vehicle for transporting aeroplanes comprising a chassis; an ogive structure covering the chassis, the side of said ogive structure having the profile of the internal profile of the wings of an aeroplane; and means on each side of said ogive structure adapted to receive and support the wings.

7. A vehicle for transporting aeroplanes comprising a chassis, forming the support for the aeroplane body detached from the wings; pointed arches over the chassis; and a cover over said arches and spaced therefrom, said arches having means facing the cover and adapted to form a support for the wings.

8. A vehicle for transporting aeroplanes comprising a chassis, forming a support for the aeroplane body detached from the wings; pointed arches over the chassis; longitudinal members uniting said arches on the inner side and at the apex; a cover over said arches and spaced therefrom; and a gutter at the outside of said arches adjacent the lower end thereof and within said cover, said gutters being adapted to receive the front edges of the wings and form supports therefor between the sides of the arches and the cover therefor.

9. A vehicle for transporting aeroplanes comprising a chassis having the rear part thereof depressed; an axle adjacent the depressed portion; springs from the chassis to the axle; and means for varying the distance of one end of the spring from the chassis whereby the distance between the axle and the chassis may be decreased.

10. A vehicle for transporting aeroplanes comprising a chassis having the rear part thereof depressed; an axle adjacent the depressed portion; brackets carried by the chassis in front of said axle; and springs from said axle connecting the depressed portion of the chassis to the bracket, said bracket having means whereby the spring can be connected closer to the chassis, whereby the chassis and the axle can be brought closer together substantially as and for the purpose set forth.

11. A vehicle for transporting aeroplanes, comprising a wheeled chassis surmounted by a framework, wherein the longitudinal members of the chassis are set lower behind the axle in order to facilitate the loading and unloading of the aeroplane and to increase at that point the space available inside the said vehicle for the aeroplane without increasing the total height above the ground.

In testimony whereof I have hereunto set my hand at Paris (France), this 25th day of August, 1914.

JACQUES SLOAN.

In the presence of two witnesses:
DE WIT C. POOLE, Jr.,
JEAN LULAUXT.

Copies of this patent may be obtained for five cents each, by addressing the "Commissioner of Patents, Washington, D. C."